United States Patent
Bogiel et al.

(10) Patent No.: US 6,186,825 B1
(45) Date of Patent: Feb. 13, 2001

(54) CONNECTOR MOUNTING SYSTEM FOR MODULAR WALL PANELS

(75) Inventors: Steven B. Bogiel, Lisle; Mark M. Data, Bolingbrook, both of IL (US)

(73) Assignee: Molex Incorporated, Lisle, IL (US)

( * ) Notice: Under 35 U.S.C. 154(b), the term of this patent shall be extended for 0 days.

(21) Appl. No.: 09/348,862

(22) Filed: Jul. 7, 1999

(51) Int. Cl.7 .................................................. H01R 13/66
(52) U.S. Cl. ........................................... 439/532; 439/215
(58) Field of Search ...................... 439/716, 215, 439/557, 532

(56) References Cited

U.S. PATENT DOCUMENTS

| | | |
|---|---|---|
| 3,355,702 | 11/1967 | Mundschenk et al. . |
| 4,029,385 | 6/1977 | Mysiak et al. ........................ 339/128 |
| 4,073,563 * | 2/1978 | Bailey et al. .......................... 439/128 |
| 4,124,267 | 11/1978 | Mines et al. .......................... 339/125 |
| 4,270,020 * | 5/1981 | Kenwothy et al. ...................... 174/48 |
| 4,295,697 * | 10/1981 | Grime . |
| 4,313,646 | 2/1982 | Millhimes et al. .................... 339/156 |
| 4,509,813 | 4/1985 | Hesse ....................................... 339/91 |
| 5,173,061 | 12/1992 | Comerci et al. ....................... 439/536 |
| 5,203,711 | 4/1993 | Bogiel .................................... 439/215 |
| 5,203,712 | 4/1993 | Kilpatrick et al. ..................... 439/215 |
| 5,599,206 * | 2/1997 | Slack et al. ............................ 439/536 |

* cited by examiner

Primary Examiner—Renee Luebke
Assistant Examiner—James R. Harvey
(74) Attorney, Agent, or Firm—Stephen Z. Weiss

(57) ABSTRACT

A mounting arrangement is disclosed in a power distribution system for electrification of modular wall panels or the like. A mounting bracket is adapted for location in a wire raceway of a modular wall panel. An electrical receptacle is mountable on the mounting bracket. Complementary interengaging guide ribs and grooves are provided between the bracket and the receptacle for guiding the receptacle into a proper mounted position on the bracket. Complementary interengaging latch arms and latch recesses are provided between the bracket and the receptacle for locking the receptacle on the bracket at its mounted position.

16 Claims, 8 Drawing Sheets

CONNECTOR MOUNTING SYSTEM FOR MODULAR WALL PANELS

FIELD OF THE INVENTION

This invention generally relates to the art of power distribution systems and, particularly, to a connector mounting arrangement in such systems for electrification of areas such as modular wall panels.

BACKGROUND OF THE INVENTION

There are various environments wherein a plurality of different power lines, including power circuits and ground circuits, lead from different power sources, which may include different transformers, fuses and the like, to a given area for distribution thereat. Most often, a plurality of electrical connectors are used for interconnection, respectively, with the different power lines. For instance, the connectors may be provided in the form of plug-receiving receptacles and each receptacle is interconnected to an individual power line.

An example of such an environment is in the art of modular wall panel systems which divide a given area into separate or distinct work areas. All kinds of electronic equipment, such as computers, printers, heaters and the like may be employed in each work area and must be "plugged-in" to the power distribution lines. The utilization of an electrical connector for each separate power distribution line results in very cumbersome outlet configurations involving a multiplicity of receptacles or outlets and an undesirable duplicity of many of the connector components. The need for a plurality of power lines can range from the obvious necessity of preventing overloading of a given line, to the need for providing an isolated or "clean" line having an isolated ground whereby sensitive equipment such as computers or delicate sensing devices are not exposed to current spikes or impulses caused by other electrical equipment, such as a heater, being interconnected to the same power line. An example of a problem which could occur when sharing such equipment is the accidental erasure of computer data, for instance.

One of the problems in designing such power distribution systems for modular wall panels is that the various connectors, receptacles and the like are mounted in fairly restricted wire raceways of the panels with panels having different thicknesses or widths. It would be desirable to have some form of guide means to mount various components such as electrical receptacles into the raceways in panels. It would also be desirable that the guide means be useful with panels having different thicknesses or widths and to provide polarization assuring either proper orientation or assuring that only a specific component be inserted in a specific raceway location. It also is desirable to provide some form of latching means to hold the components in proper positions in the raceways. Heretofore, the very complexity of such systems have made it difficult to design simple mounting arrangements. The present invention is directed to satisfying this need and solving the various identified problems.

SUMMARY OF THE INVENTION

An object, therefore, of the invention is to provide a new and improved mounting arrangement in a power distribution system for electrification of modular wall panels or the like.

In the exemplary embodiment of the invention, the mounting arrangement includes a mounting bracket adapted for location in a wire raceway of a modular wall panel. An electrical receptacle is mountable on the mounting bracket. Generally, complementary interengaging guide means are provided between the bracket and the receptacle for guiding the receptacle into a proper mounted position on the bracket. Complementary interengaging latch means are provided between the bracket and the receptacle for locking the receptacle on the bracket at the mounted position.

As disclosed herein, the complementary interengaging guide means include a guide rib on the receptacle insertable into a guide groove in the bracket. The guide groove has a bottom wall against which a distal end of the guide rib abuts to define the mounted position of the receptacle.

The complementary interengaging latch means include a flexible latch arm on the receptacle engageable with a latch recess in the bracket.

The mounting bracket is disclosed to be generally U-shaped to define a pair of side flanges between which the receptacle is mounted. In the preferred embodiment, one of the guide means and one of the latch means are provided between the receptacle and each side flange of the generally U-shaped bracket. A pair of the mounting brackets may be assembled back-to-back in the wire raceway for receiving a pair of the receptacles on opposite sides of the wall panel.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
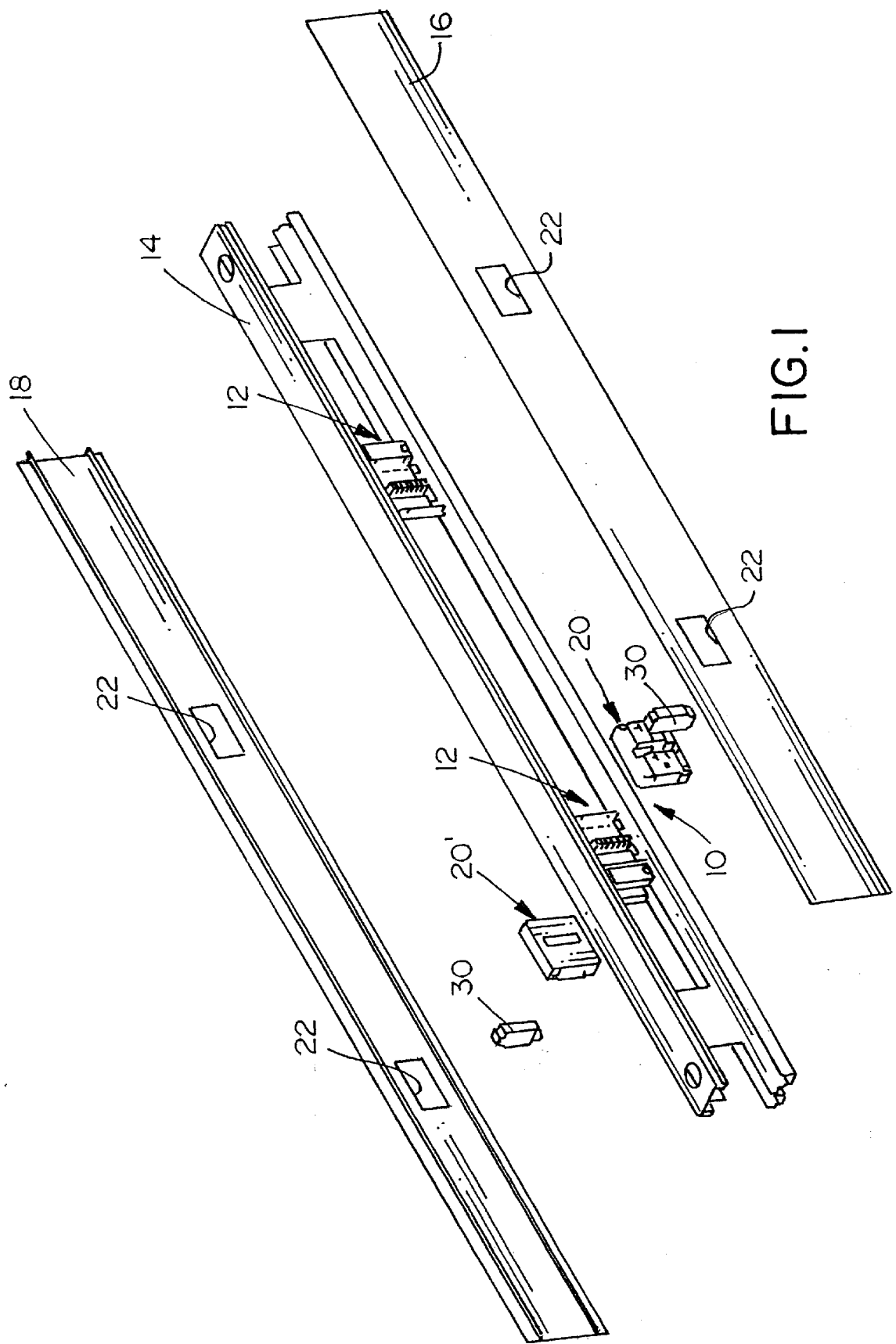
FIG. 1 is an exploded perspective view of a wire raceway assembly in a power distribution system for electrification of modular wall panels, incorporating the connector mounting arrangement of the invention.

Referring to the drawings in greater detail, and first to FIG. 1, the invention is embodied in a connector mounting arrangement, generally designated 10, in a power distribution system for electrification of modular wall panels (not shown). Suffice it to say, the mounting arrangement includes a mounting bracket, stamped and formed from metal and generally designated 12, adapted for location in a wire raceway 14 of a modular wall panel, with front and rear covers 16 and 18, respectively, adapted for closing the raceway. Each bracket 12 mounts an electrical connector or receptacle, generally designated 20. Although not clearly visible in FIG. 1, each bracket 12 may be assembled in a back-to-back arrangement with a similar, rear mounting bracket (described hereinafter) for receiving a second electrical connector or receptacle, generally designated 20', whereby receptacles will be disposed on both opposite sides of the wall panel.

Figure 2:
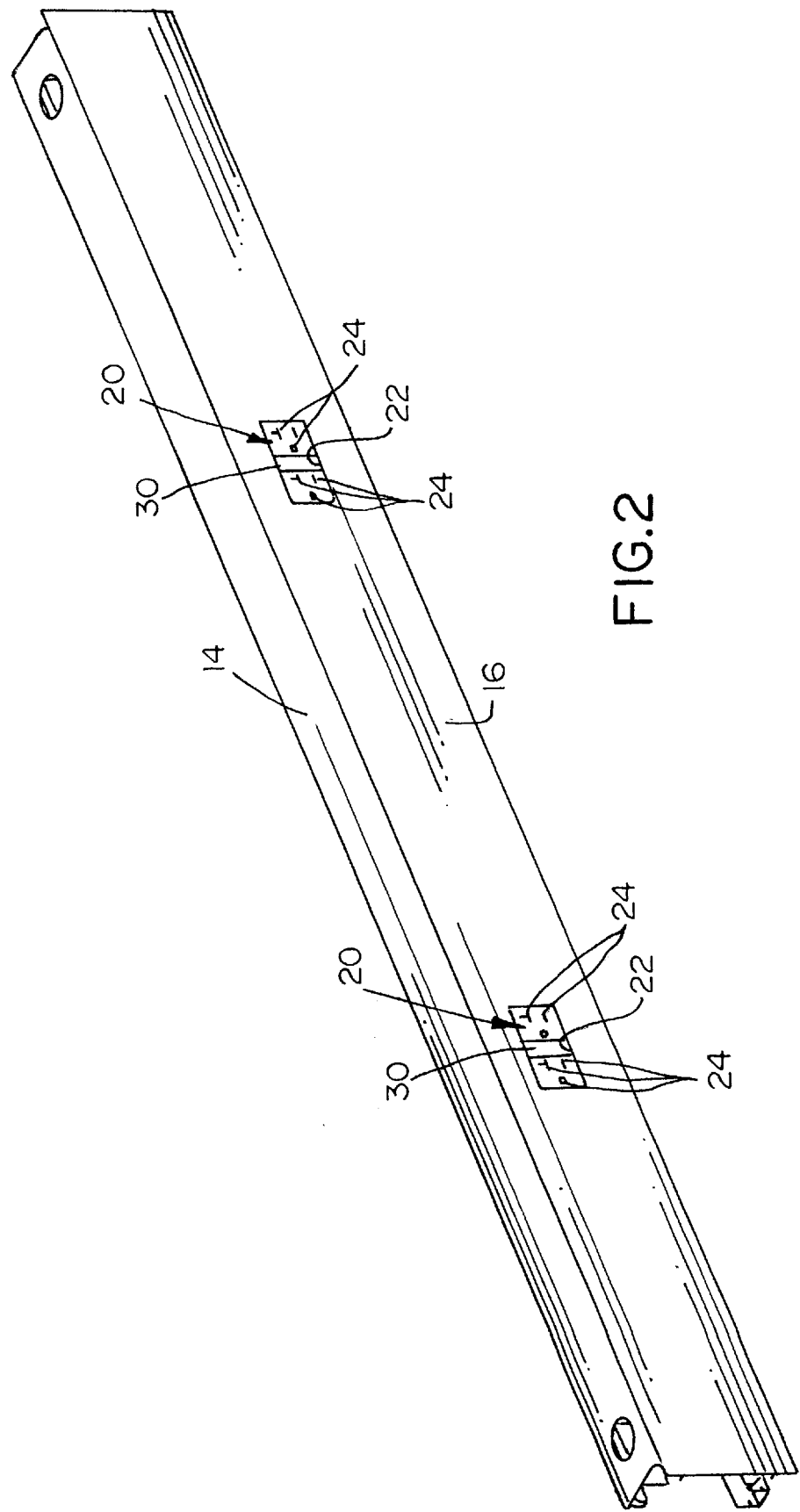
FIG. 2 is a perspective view of the completely assembled raceway.

FIG. 2 shows front panel 16 assembled to raceway 14. It can be seen that only the front face of a pair of receptacles 20 are exposed through a pair of access openings 22 in the front cover. Each connector includes two sets of slots and holes 24 for receiving a conventional grounded three-pronged electrical plug.

Figure 3:
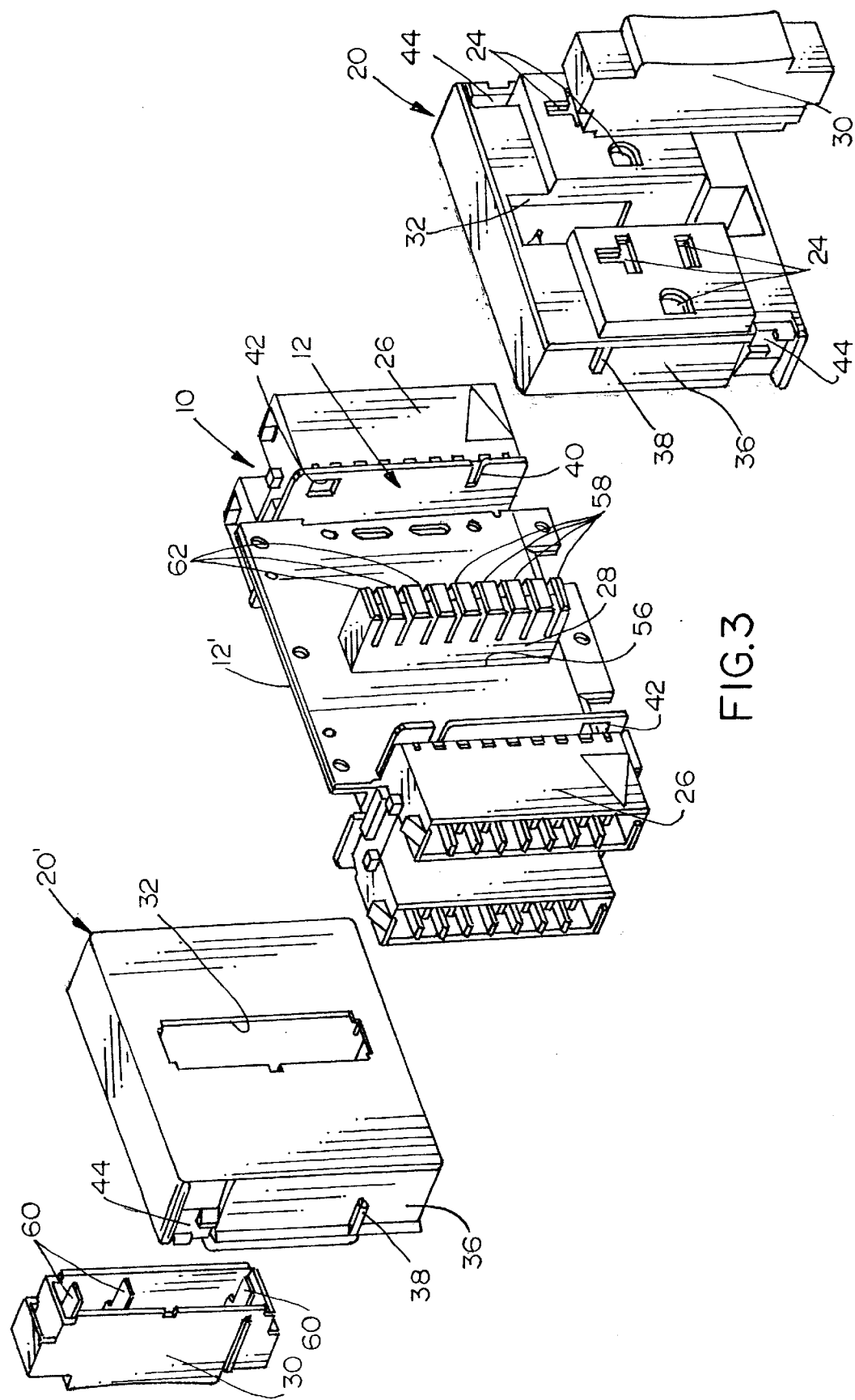
FIG. 3 is an exploded perspective view of the connector mounting arrangement of the invention.

FIG. 3 shows one of the mounting arrangements 10 which are laterally spaced along raceway 14 as described above in relation to FIG. 1. As stated above, bracket 12 may be secured to a second or rear bracket, generally designated 12', for receiving substantially identical front and rear receptacles 20 and 20', respectively. The assembled brackets may mount end receptacle modules 26 which connect to various wires or power lines extending along raceway 14. The brackets also may accommodate circuit control modules 28 which extend through the brackets and connect to interchangeable selector plugs 30 through openings 32 in receptacles 20 and 20'. The circuit control modules and interchangeable selector plugs all are part of the power distribution system within the wall panel.

Figure 4:
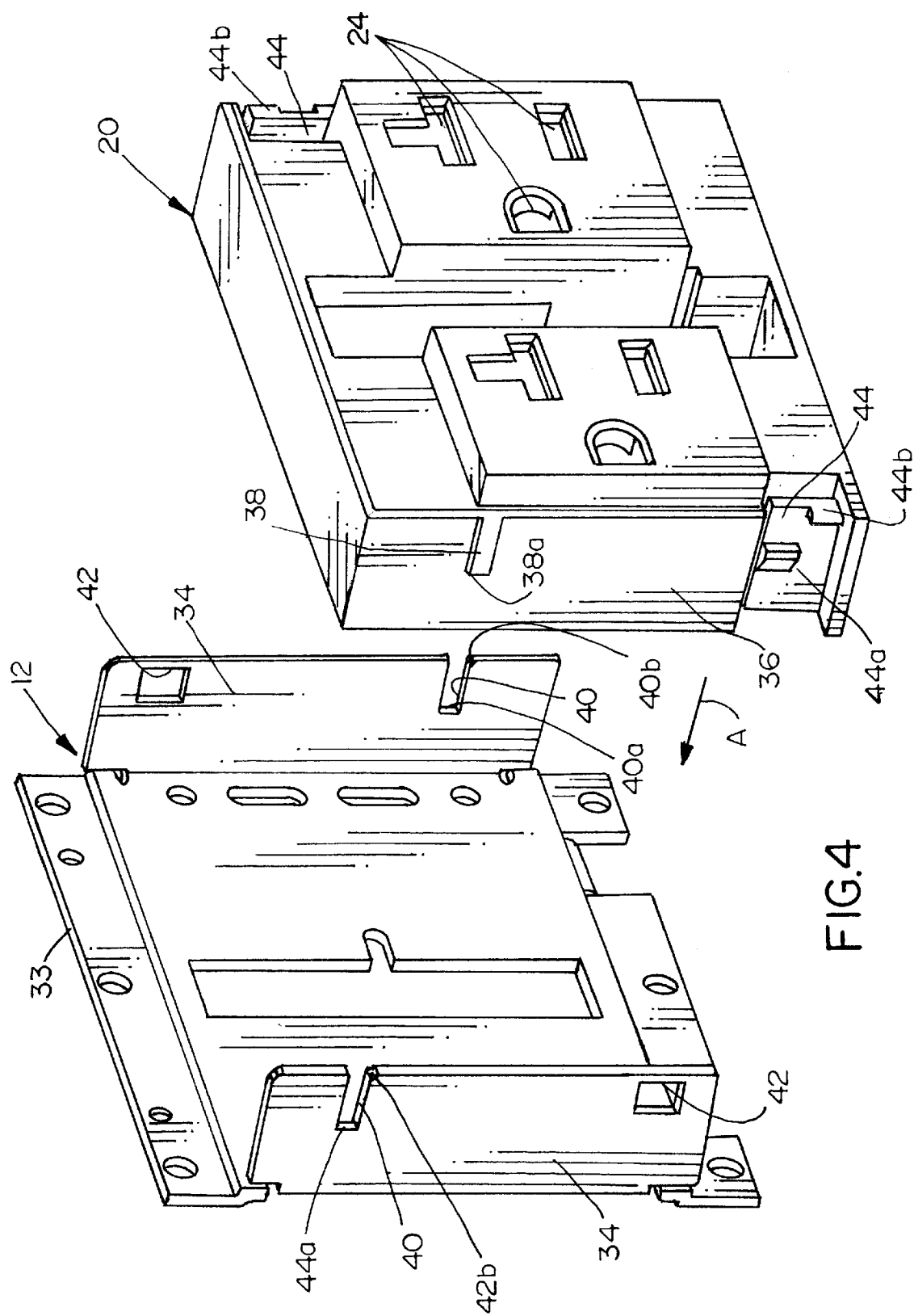
FIG. 4 is a perspective view of the mounting bracket and the electrical receptacle of the invention in unmounted condition.
Figure 5:
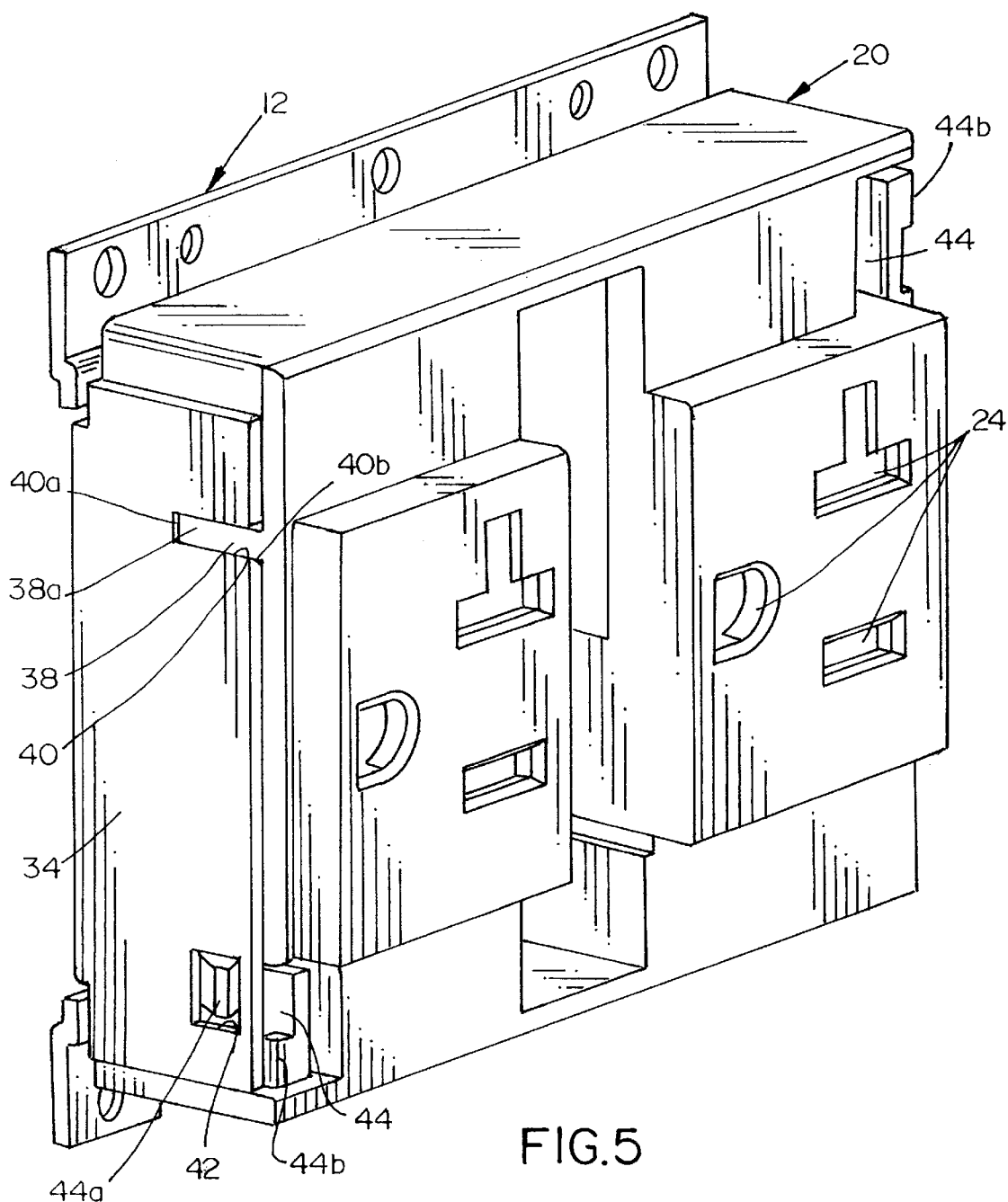
FIG. 5 is a perspective view of the bracket and receptacle fully mounted.

Referring to FIGS. 4 and 5, the connector mounting arrangement of the invention basically is incorporated between mounting brackets 12 (and 12') and electrical receptacles 20 (and 20'). FIGS. 4 and 5 show only the front bracket 12 and front receptacle 20, but the guiding and latching means of the invention are also incorporated in rear bracket 12' and rear receptacle 20'.

With that understanding, the invention contemplates that complementary interengaging guide means be provided between bracket 12 and receptacle 20 for guiding the receptacle in the direction of arrow "A" (FIG. 4) into a proper mounted position on bracket 12 as seen in FIG. 5. More particularly, bracket 12 is generally U-shaped to include a rear wall 33 and a pair of forwardly extending side walls or flanges 34. Connector 20 is mounted between flanges 34 and include opposite outside walls 36 which slide immediately within the side flanges. The housing of receptacle 20 is molded of plastic material and includes a unitarily molded guide rib 38 projecting outwardly from each outside wall 36 and extending longitudinally in the direction of arrow "A". Each guide rib terminates in a distal end 38a. Each flange 34 of bracket 12 includes a guide groove 40 having a bottom wall 40a. Each groove 40 is flared outwardly, as at 40b, to define a widened mouth for guiding guide ribs 38 into the guide grooves.

When receptacle 20 is moved in the direction of arrow "A" (FIG. 4) into position between side flanges 34 of bracket 12, distal ends 38a of guide ribs 38 enter widened mouth 40b of guide grooves 40. The final mounted position of the receptacle is defined when distal ends 38a of the guide ribs bottom out or abut against bottom walls 40a of the guide grooves as seen in FIG. 5. The relationship between the guide ribs 38 and guide grooves 40 assure not only the proper orientation of the receptacle in the bracket but also the insertion of a specific receptacle or other component into a specific bracket by only changing the location of the ribs and grooves or by providing more than one rib and groove on any one side of the receptacle and any one flange.

Figure 8:
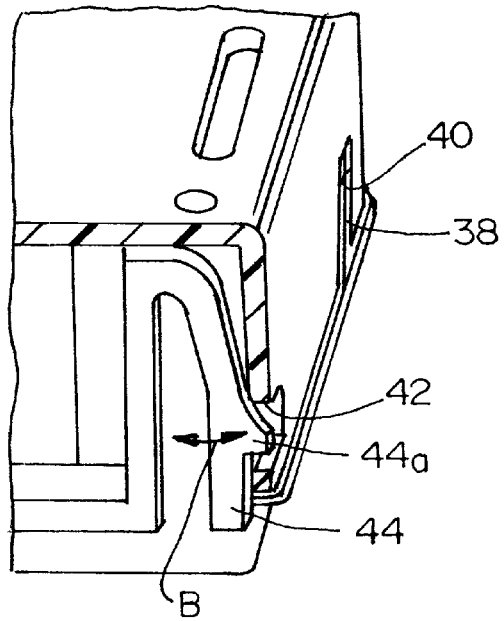
FIG. 8 is a fragmented perspective view, partially in section, showing one of the latch arms of the receptacle engaged within one of the latch recesses of the bracket.

The invention also contemplates the provision of complementary interengaging latch means between bracket 12 and receptacle 20 for locking the receptacle on the bracket at the mounted position of the receptacle. More particularly, each flange 34 of the bracket is provided with a latch recess 42 spaced from and independent of guide grooves 40. Receptacle 20 includes a cantilever-type flexible latch arm 44 molded integrally with each outside wall 36 thereof. Each latch arm includes a chamfered latch boss 44a which snaps into a respective one of the latch recesses 42 of bracket 12 when the receptacle is in its fully mounted position as seen in FIG. 5. Flexible latch arms 44 also have integral stop bosses 44b which abut against the outer edges of flanges 34 of bracket 12 to limit the movement of the receptacle into the bracket. Therefore, with the distal ends 38a of guide ribs 38 abutting against bottom walls 40a of guide grooves 40, and with stop bosses 44b of latch arms 44 abutting against the edges of side flanges 34, receptacle 20 is mounted squarely and securely within bracket 12, as latch bosses 44a prevent the receptacle from pulling back out of the bracket. FIG. 8 shows one of the chamfered latch bosses 44a of one of the flexible latch arms 40 disposed in one of the latch recesses 42. The flexible latch arm can flex in the direction of double-headed arrow "B".

Figure 6:
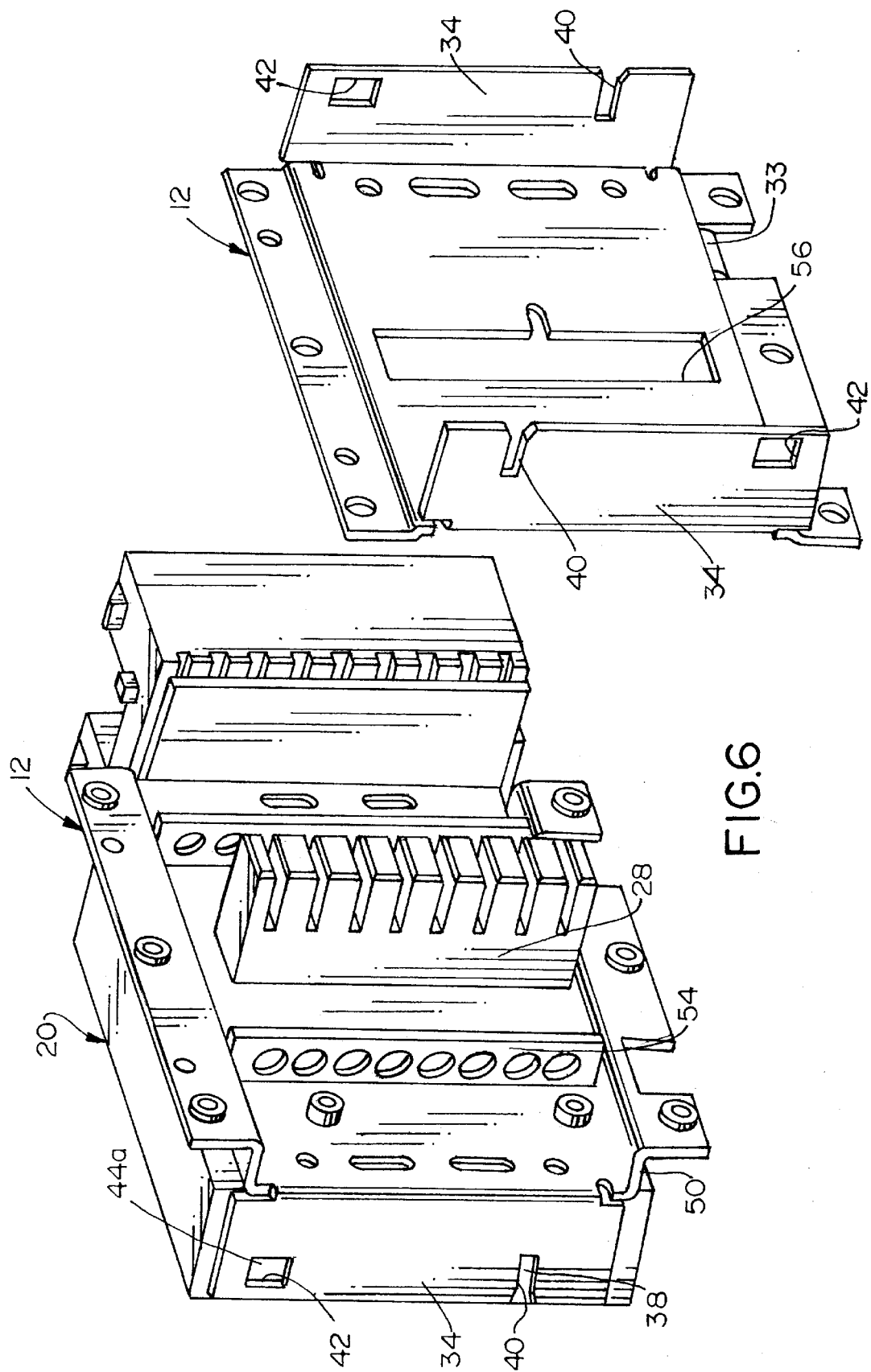
FIG. 6 is a view of the bracket, in conjunction with a second rear bracket and receptacle.
Figure 7:
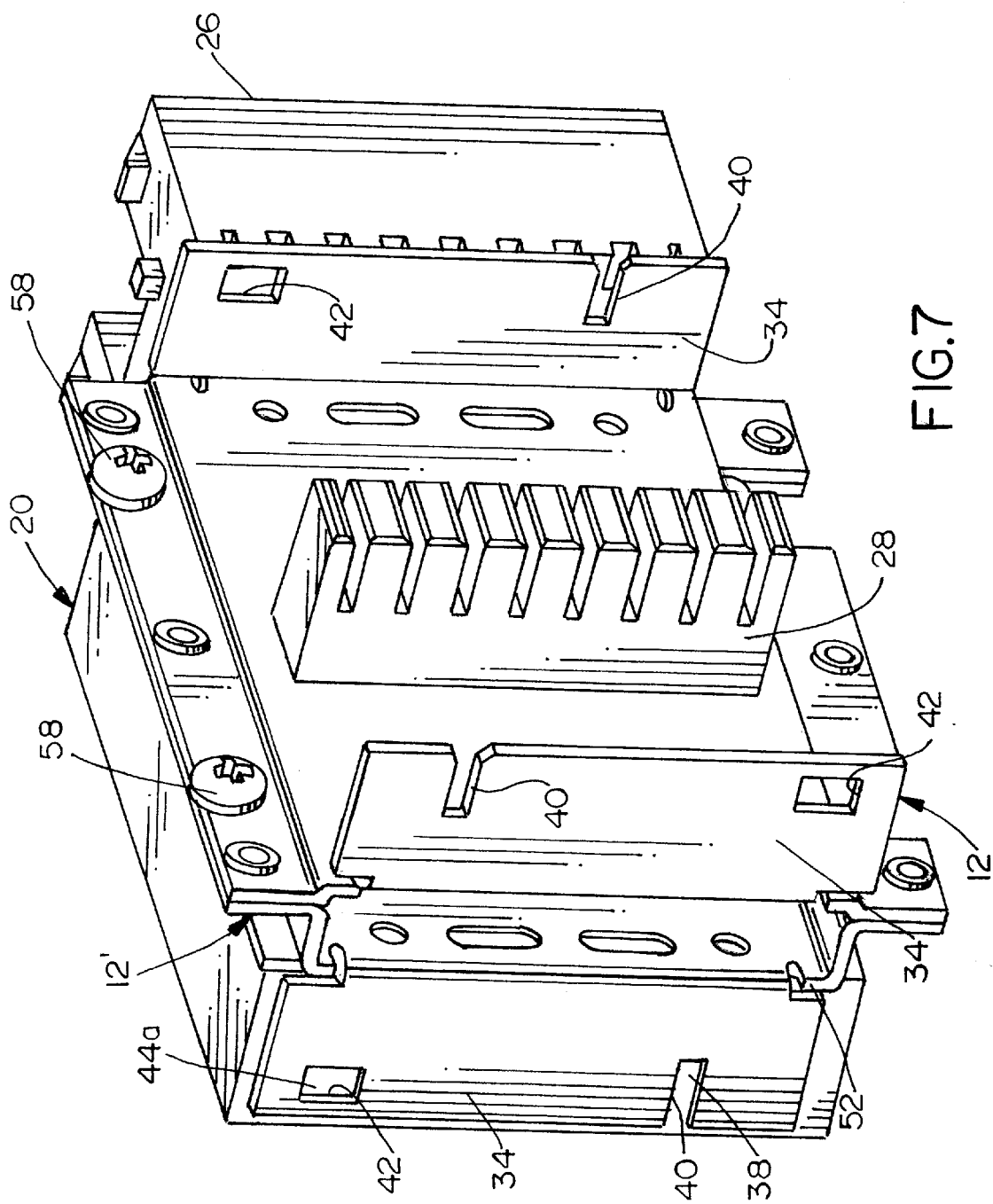
FIG. 7 is a perspective view of the bracket, rear bracket and rear receptacle in assembled condition.

FIGS. 6 and 7 show that rear bracket 12' and rear receptacle 20' also have guide grooves 40 and guide ribs 38, respectively, as well as latch recesses 42 and latch bosses 44a, respectively. Therefore, the structure and function of the guide means and latch means between the rear bracket and the rear receptacle are substantially identical to front bracket 12 and front receptacle 20.

The primary difference between rear bracket 12' in FIGS. 6 and 7 versus front bracket 12 is that the rear bracket is channel-shaped, as at 50, to define an interior conduit 52 (FIG. 7) between the brackets and through which electrical wires, power lines or the like can extend. In fact, a wire management block 54 (FIG. 6) is located between the brackets. It can be seen that circuit control module 28 actually is fixed to wire management block 54 and extends through an opening 56 in the front bracket. The front and rear brackets are secured in assembly by appropriate fasteners, such as screws or bolts 58 shown in FIG. 7.

Figure 9:
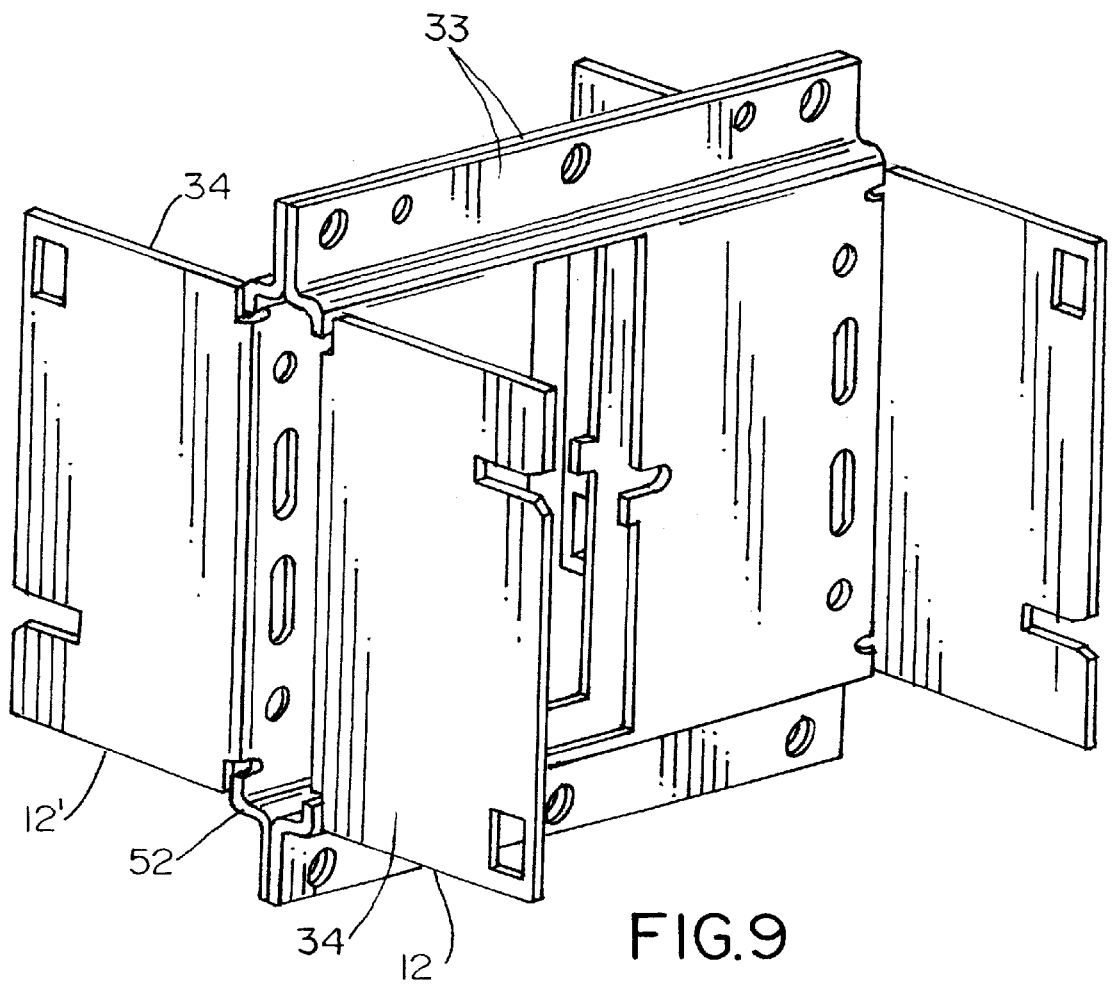
FIG. 9 is a perspective view of the bracket and rear bracket having long side flanges.

FIG. 9 shows a slightly different assembly of the rear bracket 12 and the bracket 12. Both are identical and both form an interior conduit 52. These two brackets show a flange 34 which is longer than the flanges in the other figures. This allows the use of the same electrical connector or receptacle 20 with panels having different thicknesses or widths. To insure that receptacle 20 will always be in electrical engagement with circuit control module 28, even if the flange 34 is of a different length, the blade terminals 60, as shown in FIG. 3 of selector plug 30, are elongated to electrically engage terminals (not shown) located within slots 62 of circuit control module 28. Therefore, the blade terminals 60 will still be in contact with the terminals in circuit control module 28 even if they are located in a range of distances between them.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A mounting arrangement in a power distribution system for electrification of modular wall panels, comprising:
   a mounting bracket having a base parallel to the wall panel located in a wire raceway of a modular wall panel including a pair of side flanges extending perpendicular from the base to a free end;
   an electrical receptacle mountable on the mounting bracket between the pair of side panels;
   complementary interengaging guide means between the pair of bracket side flanges and the receptacle for guiding the receptacle into a proper mounted position on the bracket in a direction perpendicular to the base, the guide means including a guide rib on the receptacle insertable into the guide groove in the bracket, the guide groove extending from the free end toward the base; and
   complementary interengaging latch means separate from the complementary interengaging guide means between each side flange of the bracket and the receptacle for locking the receptacle on the bracket at said mounted position.

2. The mounting arrangement of claim 1 wherein said guide groove has a bottom wall against which a distal end of said guide rib abuts to define the mounted position of the receptacle.

3. The mounting arrangement of claim 1 wherein said complementary interengaging latch means include a flexible latch arm on the receptacle engageable with a latch recess in the bracket.

4. The mounting arrangement of claim 1 wherein said mounting bracket is stamped and formed from sheet metal and is generally U-shaped to define the pair of side flanges between which the receptacle is mounted.

5. The mounting arrangement of claim 4, including one of said guide means and one of said latch means between the receptacle and each side flange of the generally U-shaped bracket.

6. The mounting arrangement of claim 1, including a pair of said mounting brackets assembled back-to-back in said wire raceway for receiving a pair of said receptacles on opposite sides of the wall panel.

7. A mounting arrangement in a power distribution system for electrification of modular wall panels, comprising:
   a mounting bracket having a base parallel to the wall pane located in a wire raceway of a modular wall panel including a pair of side flanges extending perpendicular from the base to a free end having opposed sides;
   an electrical receptacle having opposed sides mountable on the mounting bracket between the pair of side flanges;
   a guide rib on each opposed side of the receptacle;
   a guide groove in each opposite side flange of the bracket the guide groove extending from the free end toward the base for slidably receiving the guide rib;
   a latch recess in each side flange of the bracket; and
   a flexible latch arm separate from the rib on each opposed side of the receptacle engageable in the latch recess.

8. The mounting arrangement of claim 7 wherein said guide groove has a bottom wall against which a distal end of said guide rib abuts to define a mounted position of the receptacle.

9. The mounting arrangement of claim 7 wherein said mounting bracket is stamped and formed from sheet metal and is generally U-shaped to define the pair of side flanges between which the receptacle is mounted.

10. The mounting arrangement of claim 1, including a second mounting bracket assembled back-to-back to said mounting bracket in said wire raceway for receiving a second receptacle located opposite said receptacle on opposite sides of the wall panel.

11. A connector mounting arrangement in a power distribution system, comprising:
    a mounting bracket having a base and a pair of side flanges extending perpendicular from the base to a free end;
    a connector mountable on the mounting bracket between the pair of side flanges;
    complementary interengaging guide means between each side flange of the bracket and the connector for guiding the connector into a proper mounted position on the bracket, the guide means including a guide rib on the connector insertable into a guide groove in the bracket the guide groove extending from the free end toward the base; and
    complementary interengaging latch means separate from the complimentary interengaging guide means between the pair of bracket side flanges and the connector for locking the connector on the bracket of said mounted position.

12. The connector mounting arrangement of claim 11 wherein said guide groove has a bottom wall against which a distal end of said guide rib abuts to define the mounted position of the connector.

13. The connector mounting arrangement of claim 11 wherein said complementary interengaging latch means include a flexible latch arm on the connector engageable with a latch recess in the bracket.

14. The connector mounting arrangement of claim 11 wherein said mounting bracket is stamped and formed from sheet metal and is generally U-shaped to define the pair of side flanges between which the connector is mounted.

15. The connector mounting arrangement of claim 14, including one of said guide means and one of said latch means between the connector and each side flange of the generally U-shaped bracket.

16. The connector mounting arrangement of claim 11, including a pair of said mounting brackets assembled back-to-back in said wire raceway for receiving a pair of said connectors on opposite sides of the wall panel.

* * * * *